United States Patent
Morita et al.

(10) Patent No.: US 12,142,777 B2
(45) Date of Patent: Nov. 12, 2024

(54) STACKED BATTERY PACK

(71) Applicant: TDK Corporation, Tokyo (JP)

(72) Inventors: Hideyo Morita, Tokyo (JP); Yuji Uehara, Tokyo (JP); Koki Kawamura, Tokyo (JP)

(73) Assignee: TDK Corporation, Tokyo (JP)

( * ) Notice: Subject to any disclaimer, the term of this patent is extended or adjusted under 35 U.S.C. 154(b) by 496 days.

(21) Appl. No.: 17/038,664

(22) Filed: Sep. 30, 2020

(65) Prior Publication Data

US 2021/0143379 A1    May 13, 2021

(30) Foreign Application Priority Data

Nov. 13, 2019   (JP) .................................. 2019-205616

(51) Int. Cl.
*H01M 50/20* (2021.01)
*H01M 50/202* (2021.01)
*H01M 50/209* (2021.01)

(52) U.S. Cl.
CPC ......... *H01M 50/20* (2021.01); *H01M 50/202* (2021.01); *H01M 50/209* (2021.01); *H01M 2220/20* (2013.01)

(58) Field of Classification Search
CPC ... H01M 50/20; H01M 50/202; H01M 50/209
See application file for complete search history.

(56) References Cited

U.S. PATENT DOCUMENTS

| | | | |
|---|---|---|---|
| 10,236,134 B1 | 3/2019 | Nachman et al. | |
| 2006/0273758 A1 | 12/2006 | Sanada et al. | |
| 2008/0299452 A1 | 12/2008 | Nakazawa | |
| 2011/0223457 A1 | 9/2011 | Lee et al. | |
| 2012/0313559 A1* | 12/2012 | Tonomura | H01M 50/20 307/29 |
| 2014/0072855 A1* | 3/2014 | Schaefer | H01M 10/6554 429/120 |
| 2015/0303535 A1 | 10/2015 | White et al. | |
| 2015/0318585 A1* | 11/2015 | Morisaku | H01M 10/625 429/120 |
| 2015/0325893 A1 | 11/2015 | Burrows et al. | |
| 2015/0333304 A1* | 11/2015 | Sekine | H01M 10/6555 429/153 |

(Continued)

FOREIGN PATENT DOCUMENTS

| | | |
|---|---|---|
| EP | 1 071 147 A1 | 1/2001 |
| EP | 2 479 836 A2 | 7/2012 |

(Continued)

OTHER PUBLICATIONS

Partial European Search Report issued in corresponding European Patent Application No. 20207406.8-1103, dated Mar. 17, 2021.

(Continued)

*Primary Examiner* — Jonathan G Jelsma

(74) *Attorney, Agent, or Firm* — Rimon P.C.

(57) ABSTRACT

Disclosed herein is a stacked battery pack that includes a plurality of unit cells stacked in a stacking direction. Each of the plurality of unit cells includes a resin holder, a flat cell housed in the resin holder, and a metal plate covering the flat cell, thereby the flat cell is sandwiched between the resin holder and the metal plate in the stacking direction.

7 Claims, 15 Drawing Sheets

(56) References Cited

U.S. PATENT DOCUMENTS

| | | |
|---|---|---|
| 2015/0357616 A1* | 12/2015 | Morisaku ............ H01M 10/613 429/96 |
| 2017/0062884 A1 | 3/2017 | Frutschy et al. |
| 2017/0331164 A1 | 11/2017 | Kwon |
| 2018/0034121 A1 | 2/2018 | Kwon et al. |
| 2018/0145382 A1 | 5/2018 | Harris et al. |
| 2018/0269548 A1 | 9/2018 | Chi et al. |
| 2018/0309101 A1 | 10/2018 | Nakai et al. |
| 2018/0323413 A1 | 11/2018 | Nicholls |
| 2018/0375071 A1 | 12/2018 | Takasaki |
| 2019/0020079 A1 | 1/2019 | Lee et al. |
| 2019/0067760 A1 | 2/2019 | Son et al. |
| 2019/0165345 A1 | 5/2019 | Koetting et al. |
| 2019/0245168 A1 | 8/2019 | Qin et al. |
| 2019/0252715 A1 | 8/2019 | Kawase et al. |
| 2019/0267686 A1 | 8/2019 | Shimizu et al. |
| 2019/0280260 A1 | 9/2019 | Shimizu |
| 2019/0288357 A1 | 9/2019 | Son et al. |
| 2020/0052256 A1 | 2/2020 | Melack et al. |
| 2020/0176737 A1 | 6/2020 | Melack et al. |

FOREIGN PATENT DOCUMENTS

| | | | |
|---|---|---|---|
| EP | 2 557 627 A1 | 2/2013 | |
| EP | 3 182 482 A1 | 6/2017 | |
| EP | 3 686 960 A1 | 7/2020 | |
| JP | 11-176400 A | 7/1999 | |
| JP | 2008-198860 A | 8/2008 | |
| JP | 2009-301877 A | 12/2009 | |
| JP | 2010-218716 A | 9/2010 | |
| JP | 2011-238520 A | 11/2011 | |
| JP | 2011-238521 A | 11/2011 | |
| JP | 2012-511802 A | 5/2012 | |
| JP | 2013-246877 A | 12/2013 | |
| JP | 2017-123313 A | 7/2017 | |
| JP | 2019-083150 A | 5/2019 | |
| JP | 2019-140082 A | 8/2019 | |
| WO | 2010/067943 A1 | 6/2010 | |
| WO | WO-2016121279 A1 * | 8/2016 | ............ H01M 10/54 |
| WO | WO-2017064978 A1 * | 4/2017 | ............ H01G 11/10 |
| WO | 2018/037860 A1 | 3/2018 | |
| WO | 2019/058937 A1 | 3/2019 | |
| WO | 2019/059045 A1 | 3/2019 | |

OTHER PUBLICATIONS

Extended European Search Report issued in corresponding European Patent Application No. 20207406.8-1103, dated Aug. 30, 2021.

* cited by examiner

STACKED BATTERY PACK

BACKGROUND OF THE INVENTION

Field of the Invention

The present invention relates to a stacked battery pack and, more particularly, to a stacked battery pack having a plurality of stacked flat cells.

Description of Related Art

As a stacked battery pack having a plurality of stacked flat cells, those disclosed in JP 2009-301877A, JP 2012-511802, and JP 2010-218716A are known. For example, JP 2009-301877A and JP 2012-511802 describe a stacked battery pack having a structure in which flat cells are stacked through a metal plate. However, in such a configuration that flat cells are stacked simply through a metal plate, if a given flat cell abnormally generates heat, an adjacent flat cell is heated through the metal plate to abnormally generate heat, which may cause propagation of abnormal heat generation to other cells.

In this regard, in a stacked battery pack described in JP 2010-218716A, a spacer having a heat insulating sheet is provided between adjacent flat cells to prevent propagation of abnormal heat generation.

However, the spacer used in JP 2010-218716A has a complicated structure in which the heat insulating sheet is sandwiched between two metal plates.

SUMMARY

It is therefore an object of the present invention to provide a stacked battery pack capable of propagation of abnormal heat generation with a simple configuration.

A stacked battery pack according to the present invention has a plurality of stacked unit cells, wherein each of the plurality of unit cells includes a resin holder, a flat cell housed in the resin holder, and a metal plate covering the flat cell, thereby the flat cell is sandwiched between the resin holder and the metal plate in the stacking direction of the unit cells.

According to the present invention, the resin holder and the metal plate are interposed between the flat cells adjacent in the stacking direction, so that it is possible to achieve a heat insulating effect by the presence of the resin holder and a heat capacity enhancing effect, a heat dissipation effect, and a fire protection effect by the presence of the metal plate. Further, the plurality of unit cells are stacked in a direction perpendicular to the support surface of a casing, so that, unlike a case where the flat cells are arranged in parallel to the support surface of a casing, there is no need to provide a complicated support mechanism for stably supporting the individual flat cells. Thus, it is possible to stably support the individual flat cells with a simple configuration.

Each of the plurality of unit cells may further include a sheet member positioned between the resin holder and the flat cell, the sheet member being lower in heat conductivity and higher in flexibility than the resin holder. The presence of the sheet member can further enhance the heat insulating effect and prevent the individual flat cell in the resin holder from being displaced or rattling when the unit cells are stacked in a direction perpendicular to the support surface of a casing.

The metal plate may have a protrusion part that does not overlap the resin holder in the stacking direction. Thus, heat of the flat cell can be efficiently dissipated from the protrusion part. In this case, the protrusion parts adjacent in the stacking direction may be connected through a heat conducting member or may be connected directly. With this configuration, the heat capacity can be significantly enhanced, so that even if a given flat cell abnormally generates heat, the heat is efficiently dissipated through the plurality of protrusion parts. When the protrusion parts adjacent in the stacking direction may be connected directly, the protrusion parts may each include a first part constituting the same plane as a main area of the metal plate that overlaps the resin holder in the stacking direction, a second part that is connected to the first part and extends in the stacking direction, and a third part connected to the second part and the first part of another protrusion part adjacent in the stacking direction, and the first and third parts may protrude in a direction away from the resin holder as viewed from the second part to constitute a heat dissipating fin. With this configuration, a higher heat dissipation effect can be achieved. Further, the resin holder may have a side plate part that covers the flat cell in a direction perpendicular to the stacking direction. In this case, the side plate part may have a step in which the metal plate is positioned. This increases the contact area between the flat cell and the metal plate, thus making it possible to increase the heat capacity enhancing effect, heat dissipation effect, and fire protection effect by the presence of the metal plate.

The stacked battery pack according to the present invention may further include a bracket on which the plurality of stacked unit cells are placed. The bracket may include a bottom plate part positioned between the support surface of a casing and the lowermost one of the plurality of unit cells and a wall surface part connected to the bottom plate part and extending in the stacking direction. The wall surface part may have an opening at a portion facing a terminal electrode of the flat cell. Thus, a circuit board can be attached to the wall surface part. Further, even if a given flat cell abnormally generates heat to cause high-temperature gas to blow out from the vicinity of the terminal electrode, the high-temperature gas is released outside through the opening without being blocked by the wall surface part.

As described above, the stacked battery pack according to the present invention can prevent propagation of abnormal heat generation with a simple configuration.

BRIEF DESCRIPTION OF THE DRAWINGS

The above features and advantages of the present invention will be more apparent from the following description of certain preferred embodiments taken in conjunction with the accompanying drawings, in which.

BRIEF DESCRIPTION OF THE DRAWINGS

Hereinafter, a preferred embodiment of the present invention will be described in detail with reference to the accompanying drawings.

Figure 1A:
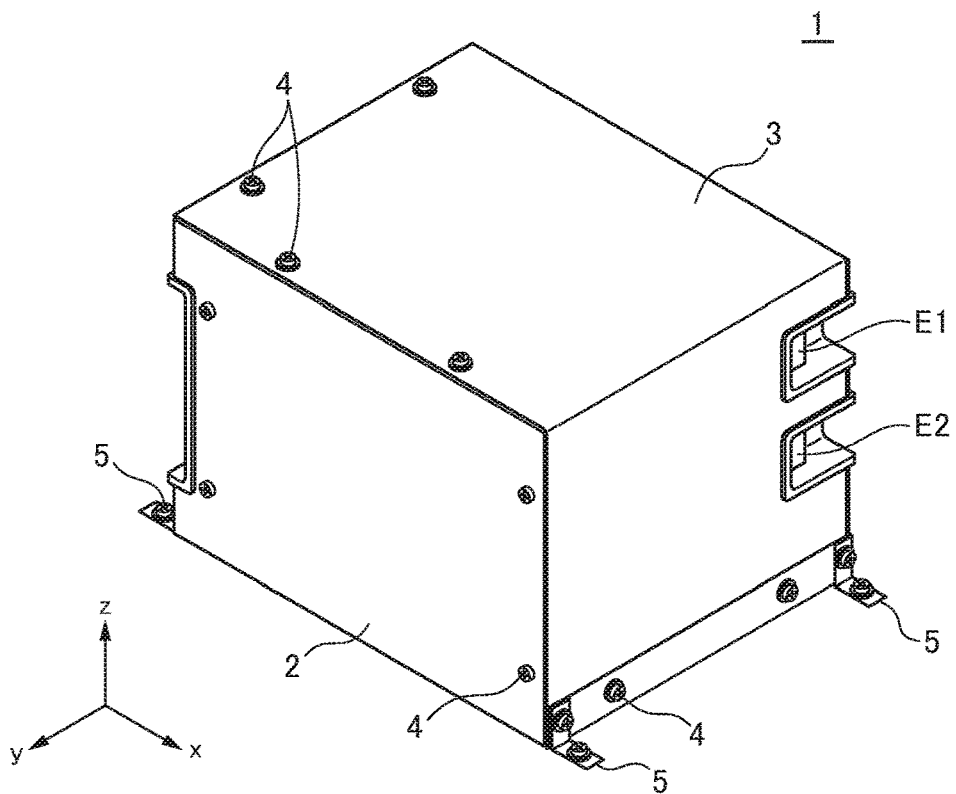
FIGS. 1A and 1B are schematic perspective views illustrating the outer appearance of a stacked battery pack 1 according to an embodiment of the present invention.
Figure 1B:
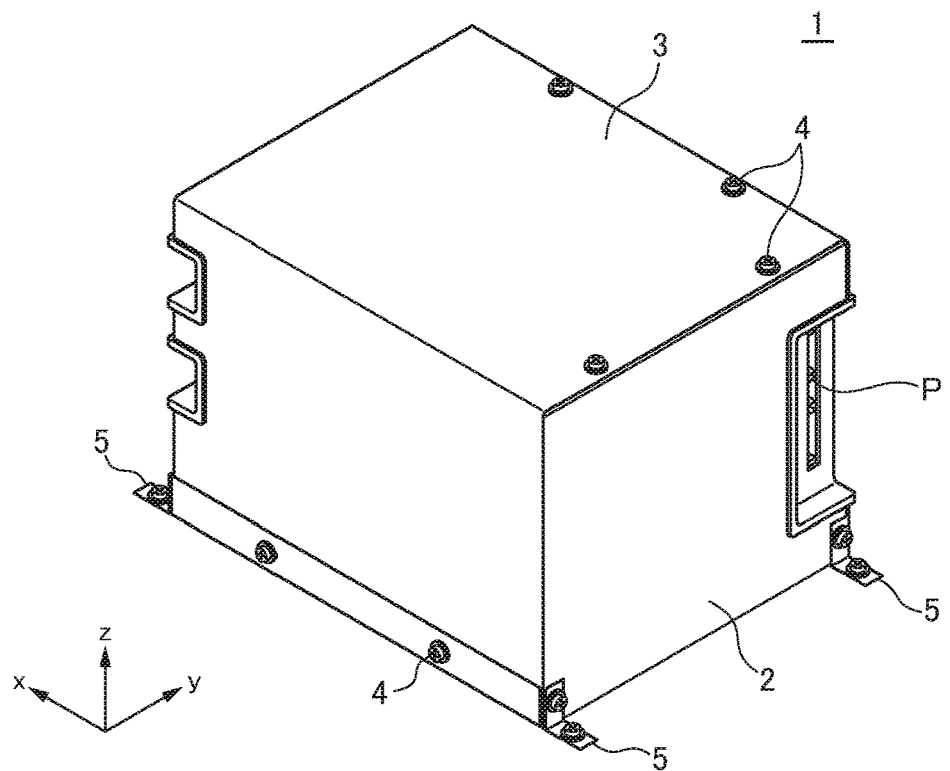

FIGS. 1A and 1B are schematic perspective views illustrating the outer appearance of a stacked battery pack 1 according to an embodiment of the present invention.

As illustrated in FIGS. 1A and 1B, the stacked battery pack 1 according to the present embodiment has a box-like outer shape having a base casing 2 and a top casing 3 which are fixed to each other by screws 4. A pair of terminal electrodes E1 and E2 are provided so as to be exposed from openings formed in the top casing 3, and a connector P is provided so as to be exposed from an opening formed in the base casing 2. The terminal electrodes E1 and E2 are a pair of terminals for charging the stacked battery pack 1. The connector P is a terminal for data input/output with respect to the stacked battery pack 1. The material of the base casing 2 and top casing 3 is not particularly limited and may be a metal material or a resin material. Using a metal material allows achievement of high reliability and high heat dissipation characteristics. Using a resin material allows achievement of weight reduction. The base casing 2 has fixing members 5 for fixing the stacked battery pack 1 according to the present embodiment to equipment (conveyance vehicle, etc.) using a power source.

Figure 2:
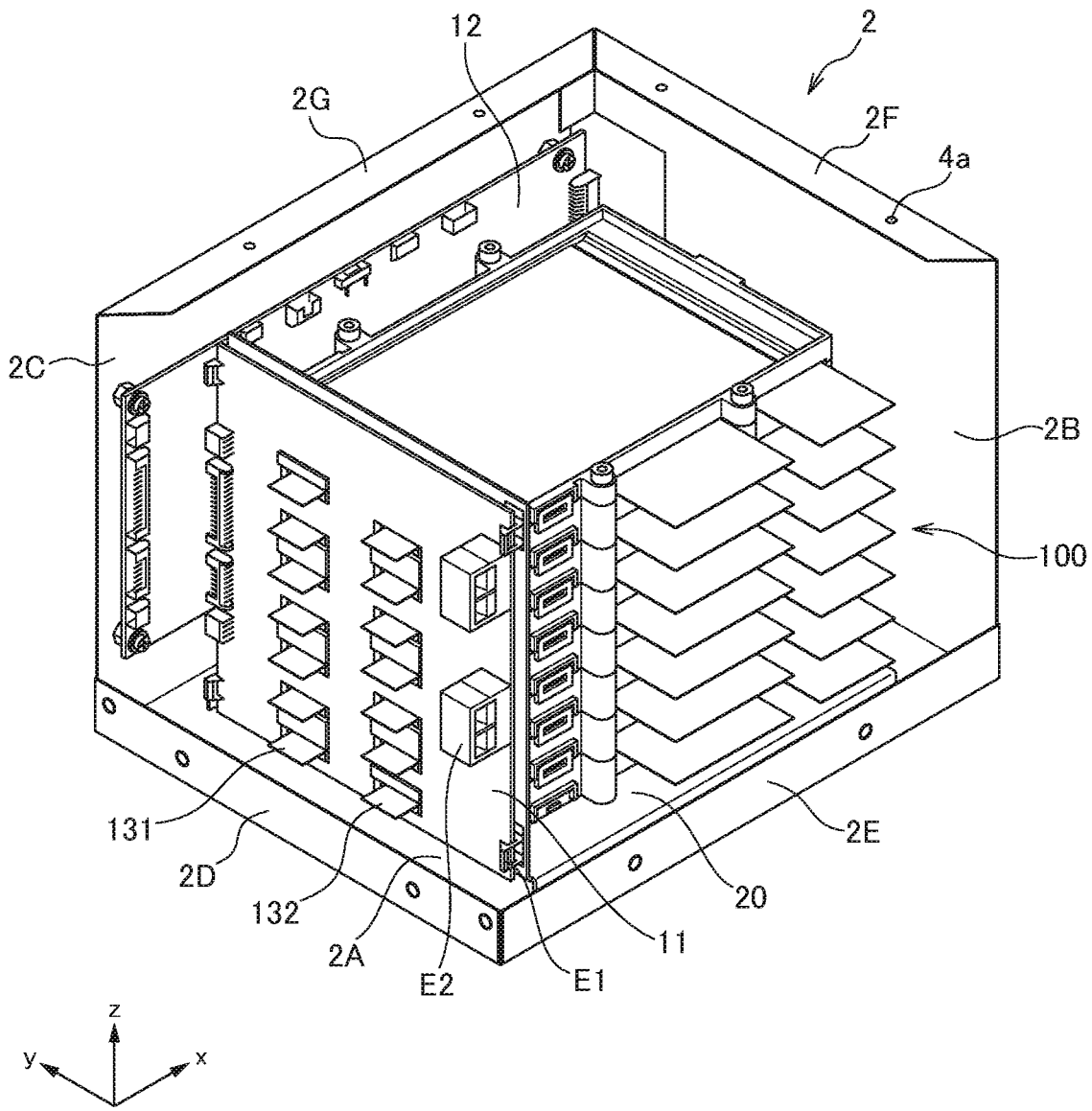
FIG. 2 is a schematic perspective view of the stacked battery pack 1 from which a top casing 3 is removed.

FIG. 2 is a schematic perspective view of the stacked battery pack 1 according to the present embodiment from which the top casing 3 is removed.

As illustrated in FIG. 2, a cell stack 100 is housed inside the casing. The base casing 2 has a bottom plate part 2A constituting the xy plane, a side plate part 2B constituting the yz plane, and a side plate part 2C constituting the xz plane. The cell stack 100 is fixed on the bottom plate part 2A constituting a support surface of the casing. The base casing 2 further has folded parts 2D and 2E continuing from the bottom plate part 2A, a folded part 2F continuing from the side plate part 2B, and a folded part 2G continuing from the side plate part 2C. The folded parts 2D to 2G each have screw holes 4a into which the screws 4 are screwed.

Figure 3:
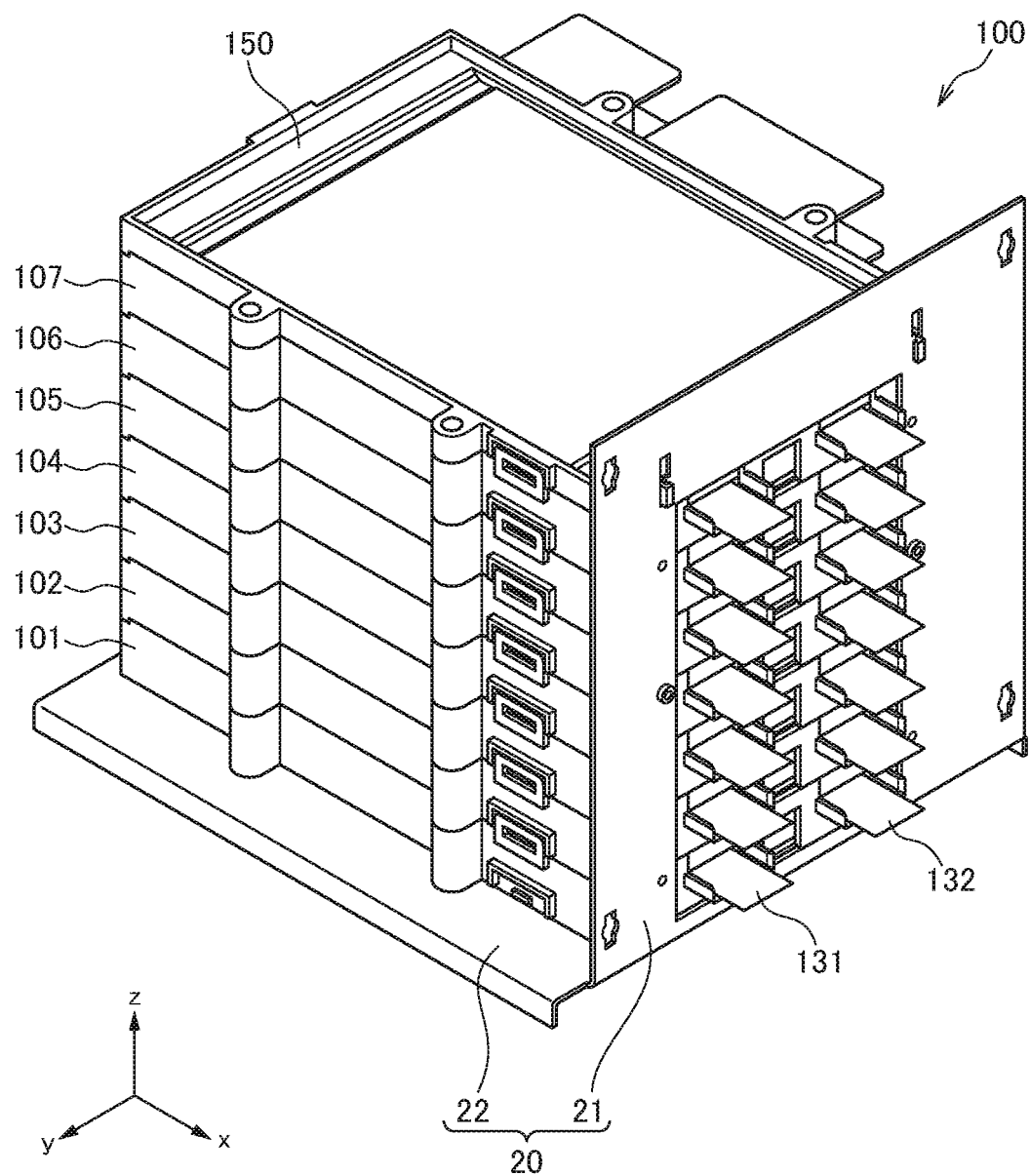
FIG. 3 is a schematic perspective view illustrating a state where a cell stack 100 is mounted on a bracket 20.
Figure 4:
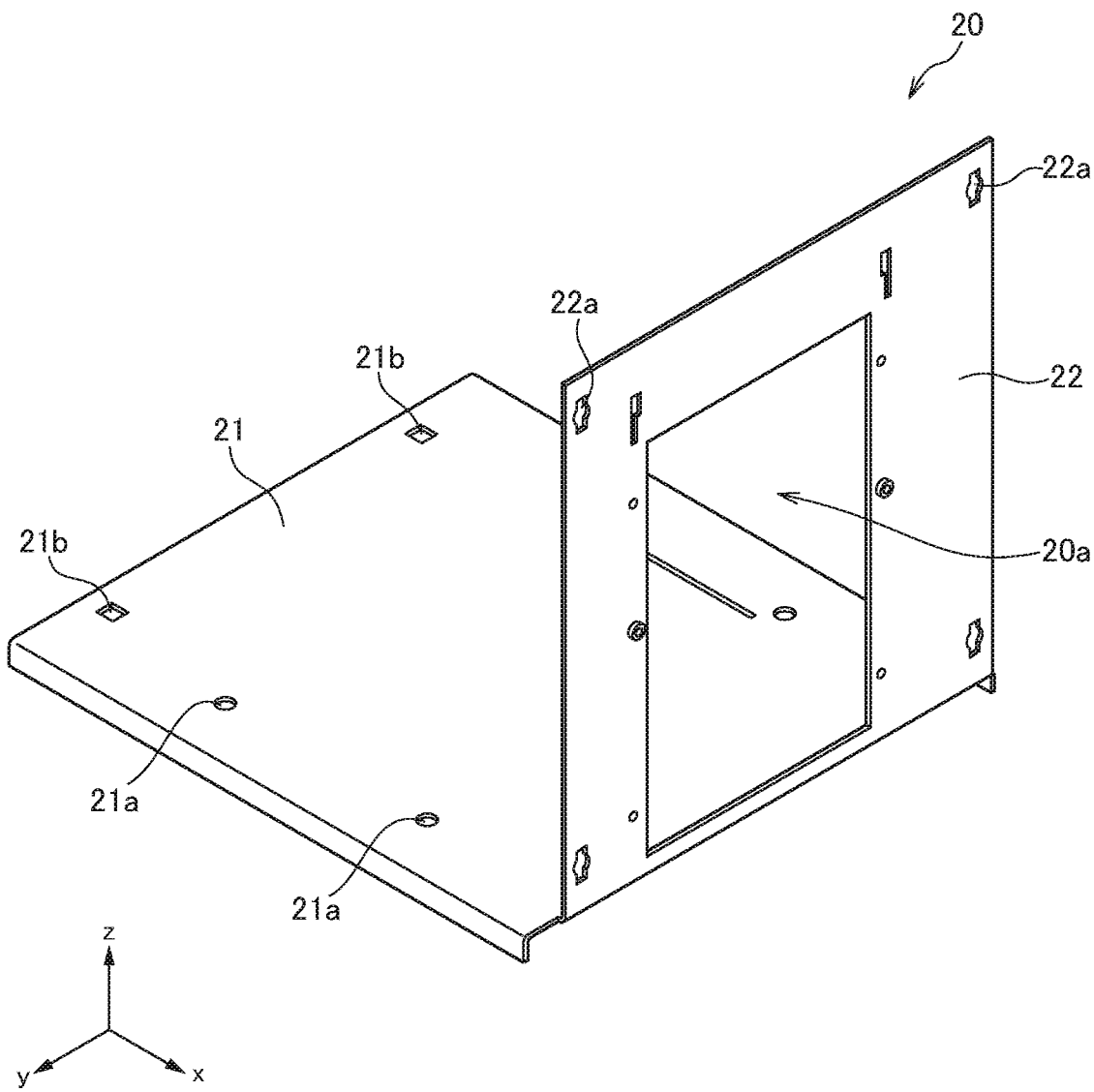
FIG. 4 is a schematic perspective view illustrating the structure of the bracket 20.

The cell stack 100 is mounted on a bracket 20, and seven unit cells 101 to 107 are stacked in the z-direction as illustrated in FIG. 3. The unit cell 107 positioned in the uppermost layer is covered with a cover 150. As illustrated in FIG. 4, the bracket 20 is a member constituted by a bottom plate part 21 constituting the xy plane and a wall surface part 22 constituting the yz plane. The cell stack 100 is mounted on the bottom plate part 21. The bracket 20 and the cell stack 100 are fixed by screwing using screw holes 21a formed in the bottom plate part 21. The bracket 20 and base casing 2 are fixed by inserting fixing pins (not illustrated) fixed to the base casing 2 into positioning holes 21b formed in the bottom plate part 21. Although not particularly limited, the bracket 20 is preferably made of a metal material.

An opening 20a is formed in the wall surface part 22 of the bracket 20. In a state where the cell stack 100 is mounted on the bracket 20, terminal electrodes 131 and 132 provided in the cell stack 100 are exposed through the opening 20a. Thus, even if a part of the cell stack 100 abnormally generates heat to cause high-temperature gas to blow out from the vicinity of the terminal electrodes 131 and 132, the high-temperature gas is released outside through the opening 20a without being blocked by the wall surface part 22. A circuit board 11 illustrated in FIG. 2 is fixed to the wall surface part 22. The circuit board 11 has a circuit for connecting the cell stack 100 and the terminal electrodes E1 and E2. The wall surface part 22 and the circuit board 11 are fixed by screwing using screw holes 22a formed in the wall surface part 22.

Another circuit board 12 is fixed to the side plate part 2C of the base casing 2. The circuit board 12 has a circuit for controlling the cell stack 100, a circuit for monitoring the operating state of the cell stack 100, and the like. These circuits are connected to an external device through the connector P.

Figure 5:
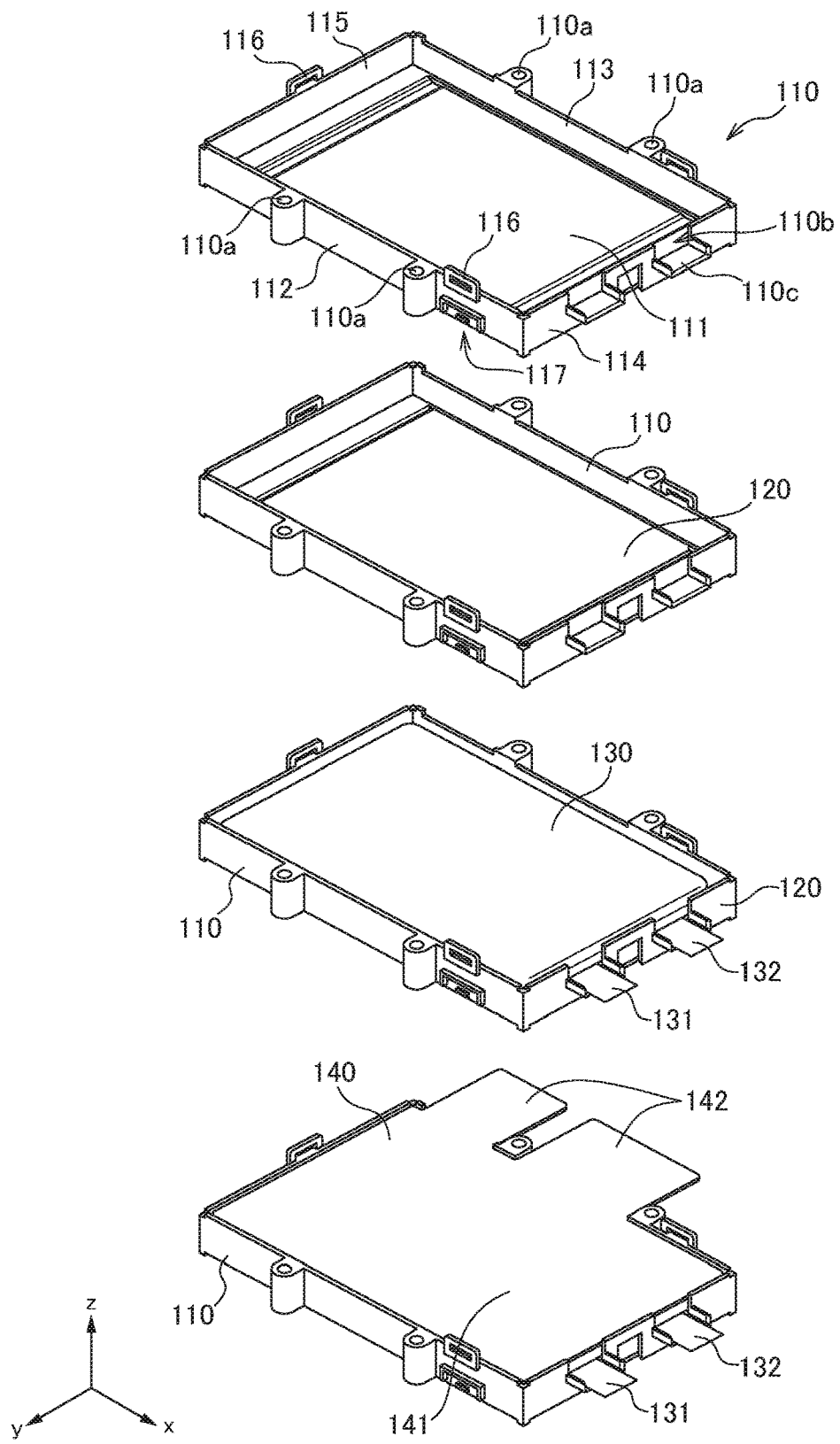
FIG. 5 is a schematic exploded perspective view for explaining the structure of a unit cell.

FIG. 5 is a schematic exploded perspective view for explaining the structure of the unit cell.

As illustrated in FIG. 5, the unit cell has a resin holder 110, a sheet member 120 provided in the resin holder 110, a flat cell 130 housed in the resin holder 110 so as to contact the sheet member 120, and a metal plate 140 covering the flat cell 130.

The resin holder 110 is a housing body having a bottom plate part 111 constituting the xy plane, side plate parts 112 and 113 constituting the xz plane, and side plate parts 114 and 115 constituting the yz plane. The dimension of the side plate part 113 in the z-direction is partially reduced so as not to interfere with the metal plate 140. Projections each having a screw hole 110a project from each of the side plate parts 112 and 113. By screwing screws (not illustrated) into the screw holes 110a, the plurality of unit cells 101 to 107 are connected together in the z-direction and fixed to the bottom plate part 21 of the bracket 20. Further, the side plate part 114 has cuts 110b for letting out the terminal electrodes 131 and 132 of the flat cell 130 and guide parts 110c for guiding the terminal electrodes 131 and 132. Furthermore, the side plate parts 112 and 113 each have positioning parts 116 and 117 protruding in the y- and z-directions, and the side plate part 115 has positioning parts 116 and 117 protruding in the x- and z-directions. Thus, when the unit cells 101 to 107 are stacked in the z-direction, the positioning parts 116 of a lower unit cell and the positioning parts 117 of an upper unit cell are fitted to each other, whereby the unit cells 101 to 107 are positioned in the xy-directions. This allows the unit cells 101 to 107 to be temporarily fixed before connection by screwing the screws into the screw holes 110a.

The sheet member 120 is a buffer member and is formed of a material which is lower in heat conductivity and higher in flexibility than the resin holder 110. Although it is not essential to use the sheet member 120 in the present invention, the presence of the sheet member 120 having the above characteristics between the bottom plate part 111 of the resin holder 110 and flat cell 130 can prevent the flat cell 130 in the resin holder 110 from being displaced or rattling. That is, the stacked battery pack 1 according to the present embodiment has a structure in which the flat cells 130 are stacked in a direction (z-direction) perpendicular to the support surface of the casing, so that when the sheet member 120 having a high flexibility is interposed between the resin holder 110 and the flat cell 130, the sheet member 120 and the resin holder 110 and flat cell 130 closely adhere due to gravity. In addition, the heat conductivity of the sheet member 120 is lower than that of the resin holder 110, so that it is possible to improve heat insulating characteristics between the flat cells adjacent in the z-direction.

The flat cell 130 is, e.g., a lithium-ion cell, in which the xy plane having the largest area has a substantially rectangular shape. The flat cell 130 is housed in the resin holder 110 such that the xy plane (bottom surface) thereof faces the bottom plate part 111 of the resin holder 110 through the sheet member 120, the xz planes (side surfaces in the longitudinal direction) thereof face the side plate parts 112 and 113 of the resin holder 110, and the yz planes (side surfaces in the short length direction) thereof face the side plate parts 114 and 115 of the resin holder 110. The terminal electrodes 131 and 132 of the flat cell 130 are led out from the yz plane (side surface in the short length direction) to protrude from the side plate part 114 of the resin holder 110 through the cuts 110b while being guided by the guide parts 110c. As the flat cell 130, whose structure is not particularly limited, there can be used a pouch cell having a structure in which a stacked body having a plurality of positive and negative electrodes which are stacked through a separator is encapsulated in a bag-like laminate film together with electrolyte solution.

The metal plate 140 is a plate-like member made of metal such as aluminum and has a main area 141 covering the xy plane (top surface) of the flat cell 130 and two protrusion parts 142 protruding in the y-direction from the main area 141. With this configuration, the flat cell 130 is sandwiched in the stacking direction between the bottom plate part 111 of the resin holder 110 and the main area 141 of the metal plate 140. Although the main area 141 of the metal plate 140 preferably contacts the xy plane (top surface) of the flat cell 130, a slight gap may exist therebetween. In this case as well, if the flat cell 130 generates heat, it expands to contact the metal plate 140. The metal plate 140 plays a role of enhancing the heat capacity of the unit cell, making the temperature distribution of the flat cell 130 in the xy plane uniform by the main area 141, and dissipating heat of the flat cell 130 outside by the protrusion part 142. Further, if the flat cell 130 abnormally generates heat and causes fire, the metal plate 140 function also as a fire protection wall for preventing high-temperature gas from being sprayed onto the flat cell 130 adjacent in the z-direction. Although it is not essential for the metal plate 140 to have the protrusion part 142, the presence of the protrusion part 142 significantly improves heat dissipation characteristics.

Figure 6:
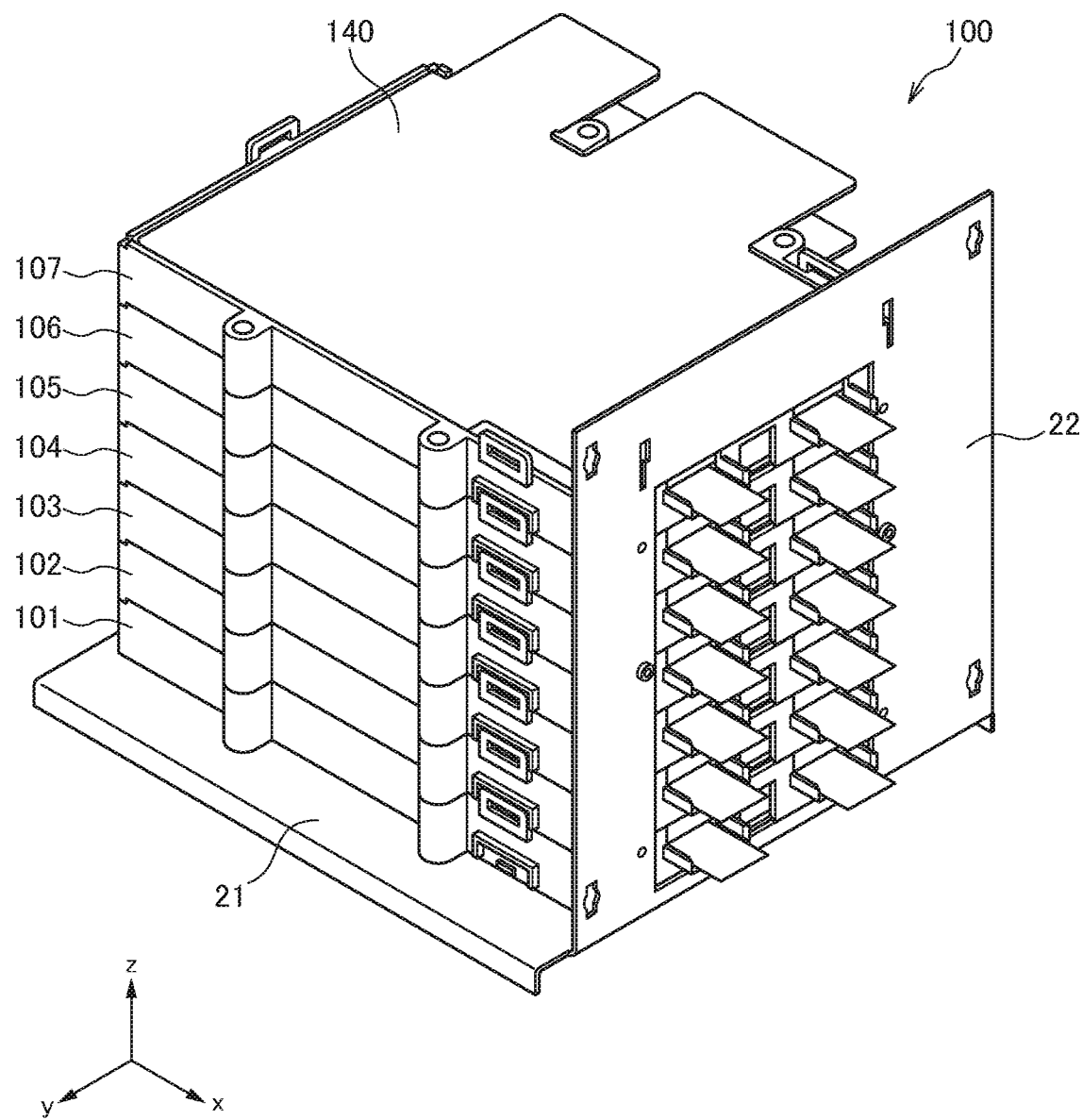
FIG. 6 is a schematic perspective view illustrating a state where unit cells 101 to 107 are stacked on the bracket 20.

The thus configured unit cells 101 to 107 are stacked on the bracket 20 as illustrated in FIG. 6 to constitute the cell stack 100. The unit cell 107 positioned in the uppermost layer of the cell stack 100 is covered with the cover 150, which is made of resin, as illustrated in FIG. 3. The unit cells 101 to 107 may be connected in series or in parallel between the terminal electrodes E1 and E2.

Figure 7:
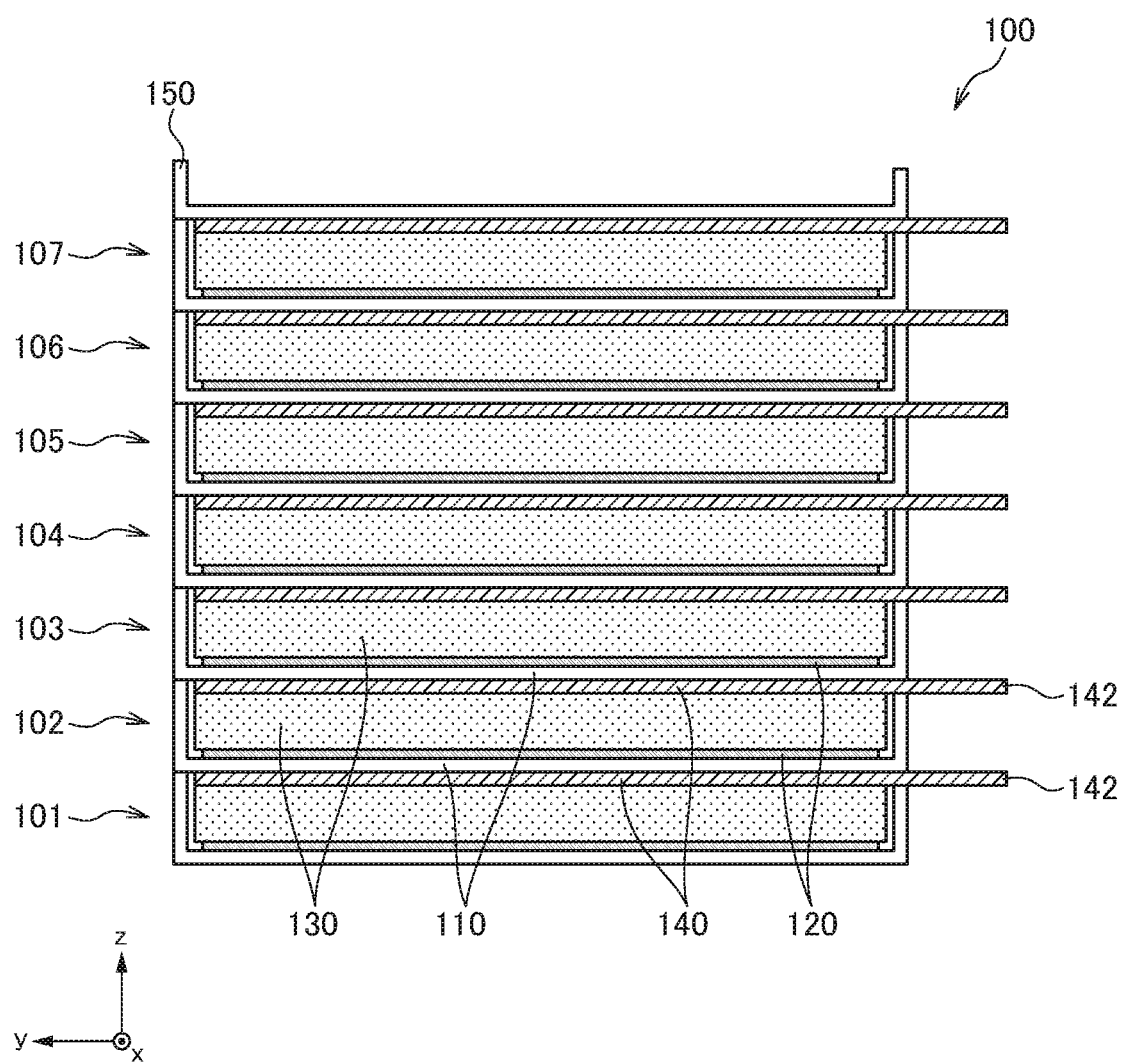
FIG. 7 is a schematic yz cross-sectional view of the cell stack 100.

FIG. 7 is a schematic yz cross-sectional view of the cell stack 100.

As illustrated in FIG. 7, the metal plate 140, the resin holder 110, and the sheet member 120 are interposed between the flat cells 130 adjacent to one another in the z-direction. The resin holder 110 and sheet member 120 function as a heat insulating member between the flat cells 130 adjacent in the z-direction. Specifically, even if a given flat cell 130 abnormally generates heat, the resin holder 110 and sheet member 120 prevent propagation of the generated heat to other flat cells 130. On the other hand, as described above, the metal plate 140 plays a role of enhancing the heat capacity of the unit cell, a role of making the temperature distribution of the flat cell 130 uniform, a role of dissipating heat of the flat cell 130 outside, and a role as a fire protection wall.

Figure 8:
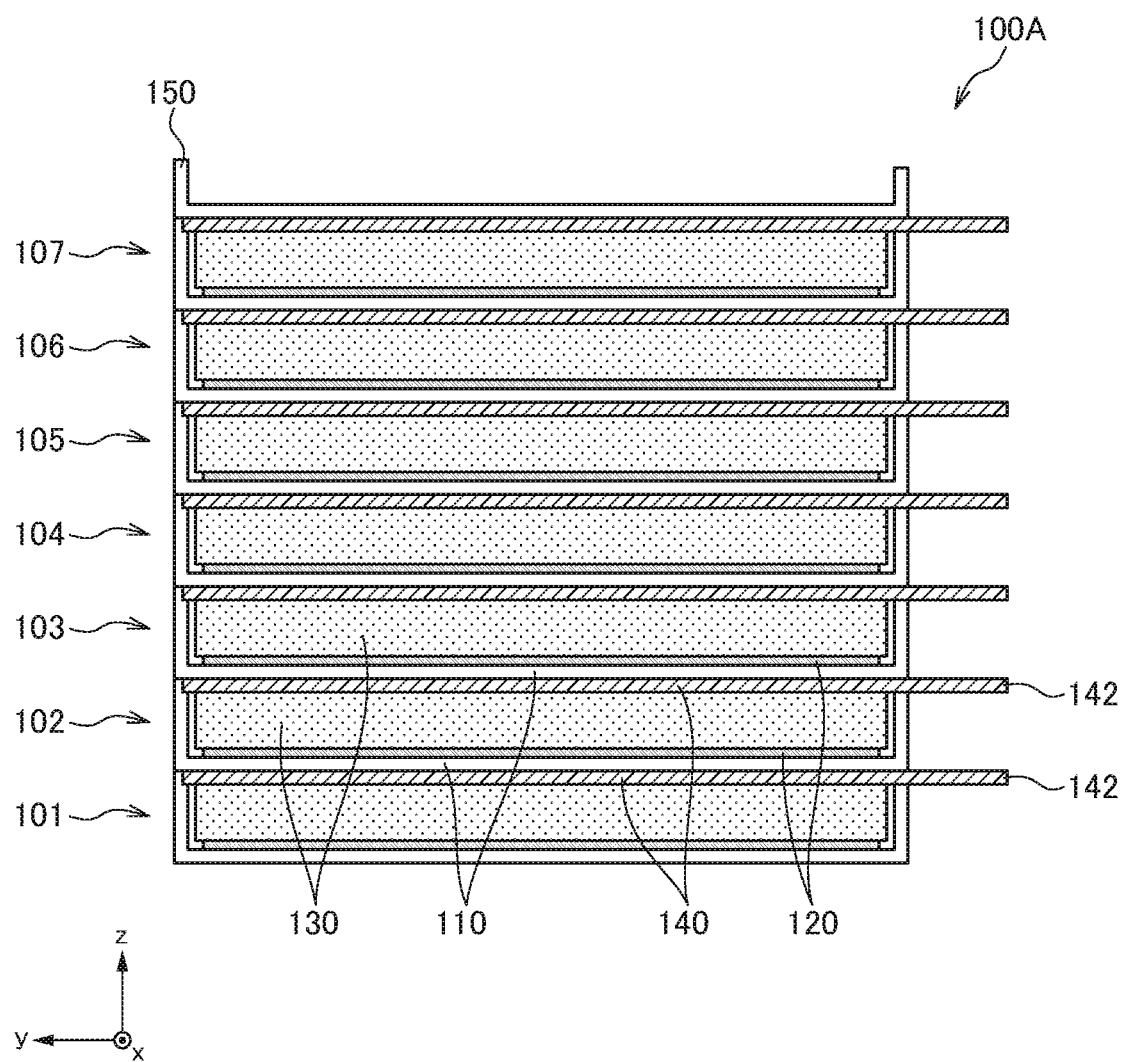
FIG. 8 is a schematic yz cross-sectional view of a cell stack 100A according to a modification.
Figure 9:
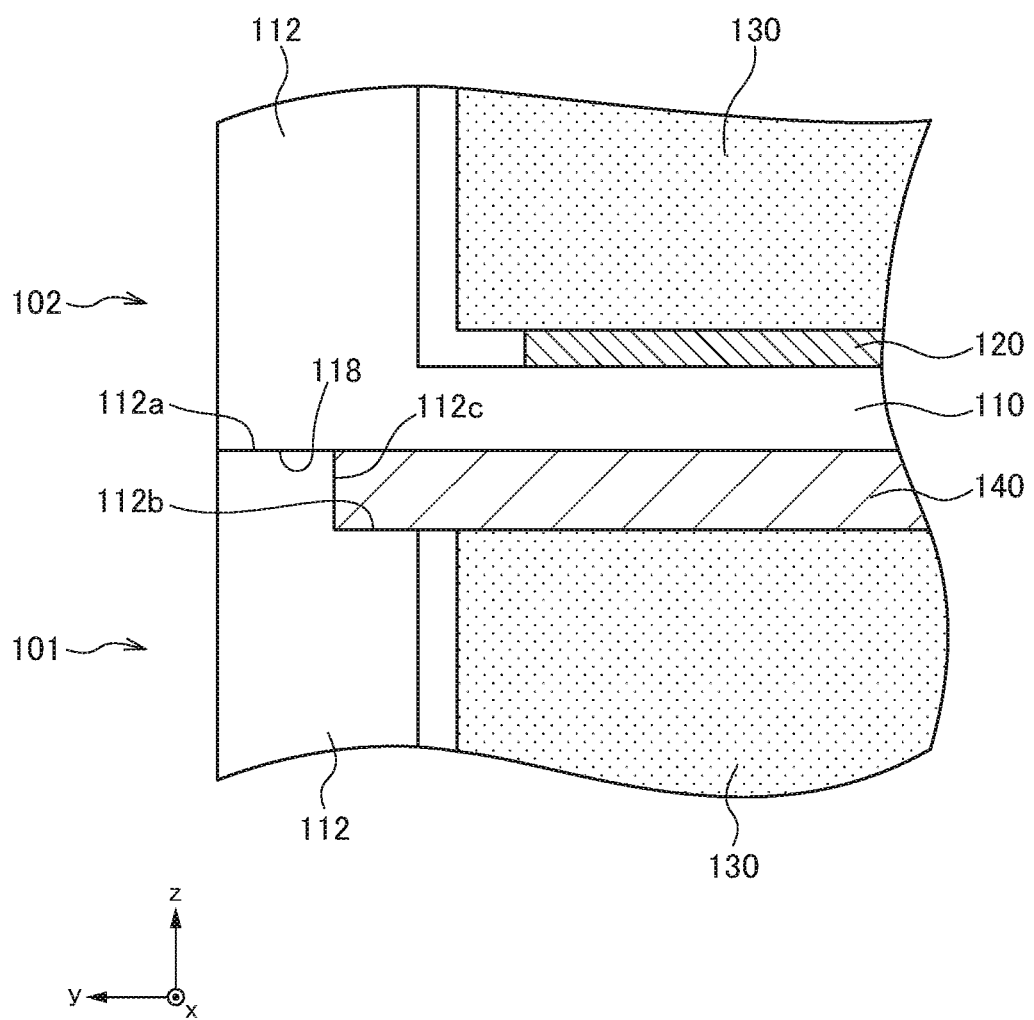
FIG. 9 is a yz cross-sectional view illustrating in an enlarged manner the main part of the cell stack 100A according to the modification.

FIG. 8 is a schematic yz cross-sectional view of a cell stack 100A according to a modification. FIG. 9 is a yz cross-sectional view illustrating in an enlarged manner the main part of the cell stack 100A according to the modification.

As illustrated in FIGS. 8 and 9, in the cell stack 100A according to the modification, a step is formed in the side plate part 112 of the resin holder 110, and the metal plate 140 is positioned in this step. That is, the side plate part 112 of the resin holder 110 has upper and lower level surfaces 112a and 112b constituting the xy plane and an inner side surface 112c constituting the xz plane, and the lower level surface 112b is located at a lower position in the z-direction than the upper level surface 112a. The lower level surface 112b and the inner side surface 112c define a cut portion, in which an end portion of the metal plate 140 in the y-direction is positioned. The upper level surface 112a contacts a back surface 118 of the resin holder 110 included in the unit cell in the upper layer. Thus, the entire top surface of the flat cell 130 contacts the metal plate 140, allowing the metal plate 140 to play the above roles more effectively.

As described above, the stacked battery pack 1 according to the present embodiment has a structure in which the unit cells 101 to 107, including the metal plates 140, are stacked in a direction perpendicular to the support surface of the casing, so that it is possible to achieve a heat insulating effect by the presence of resin holder 110 and sheet member 120 and further to achieve a heat capacity enhancing effect, a heat dissipation effect, and a fire protection effect by the presence of metal plate 140. In addition, a simple configuration involving merely stacking the resin holders 110 each housing the flat cell 130 through the metal plate 140 and fixing them by screwing allows the individual flat cells 130 to be stably supported.

Figure 10:
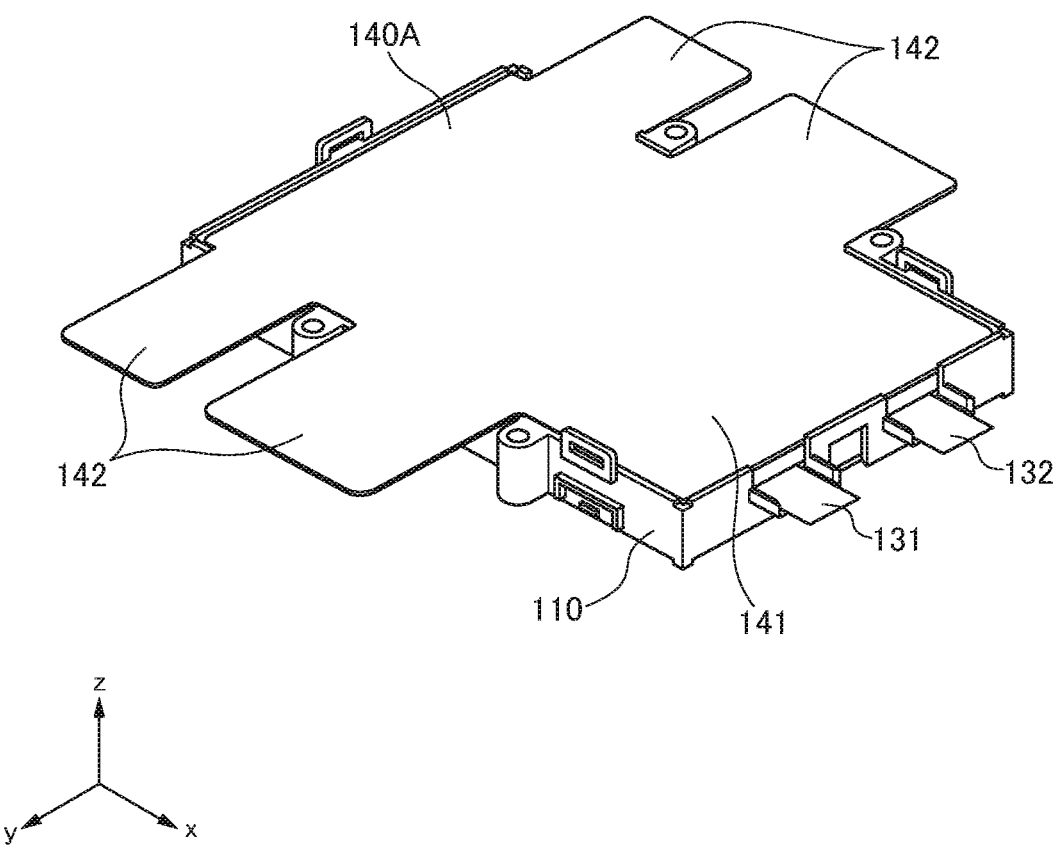
FIG. 10 is a schematic perspective view for explaining the shape of a metal plate 140A according to a first modification.

The shape of the metal plate is not particularly limited, and, as in a metal plate 140A (FIG. 10) according to a first modification, the protrusion part 142 may protrude to both sides in the y-direction. Further, although not illustrated, the protrusion part 142 may protrude in the x-direction. Furthermore, when the top casing 3 is made of a metal material, thermally connecting the protrusion part 142 of the metal plate 140A to the top casing 3 allows the entire casing to function as a heat sink, whereby a significantly large heat capacity can be achieved.

Figure 11:
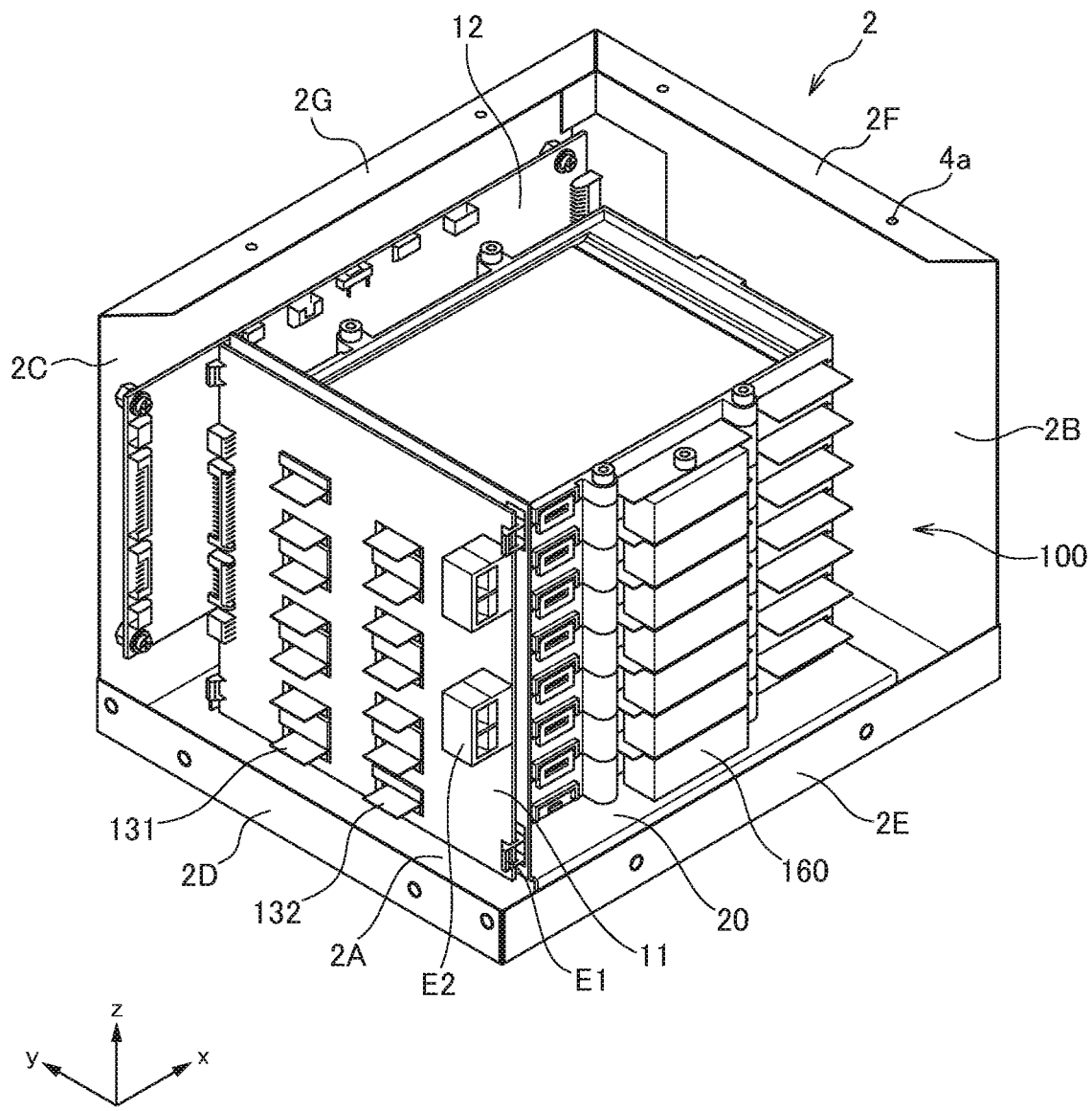
FIG. 11 is a schematic perspective view illustrating a stacked battery pack additionally provided with a heat conducting member 160.

Further, as illustrated in FIG. 11, the protrusion parts 142 of the metal plates 140 adjacent to one another in the z-direction may be connected by heat conducting members 160. The heat conducting member 160 is preferably made of metal such as aluminum and can be fixed to the protrusion part 142 by screwing. Thus, the metal plates 140 are thermally connected to one another, so that even if a given flat cell 130 abnormally generates heat, the heat can be released through the plurality of metal plates 140. In this case, the heat is applied through the metal plates 140 to other flat cells 130 that have not generated heat abnormally; however, the protrusion part 142 is positioned in an external area that does not overlap the resin holder 110 and flat cell 130 in the z-direction, so that the temperature of the heat is lowered by the heat dissipation effect of the protrusion part 142, and thus the heat to be applied to other flat cells 130 does not become significantly high.

Further, as in a metal plate 140B (FIG. 12) according to a second modification, the protrusion part 142 may extend in the z-direction in a folded manner. Thus, as illustrated in FIG. 13, which is a yz cross-sectional view of a cell stack 100B configured using the metal plates 140B, the protrusion parts 142 adjacent in the z-direction contact one another, so that the metal plates 140 can be thermally connected. The protrusion parts 142 adjacent in the z-direction may contact one another directly or may be thermally connected through a member having a high heat conductivity.

Figure 12:
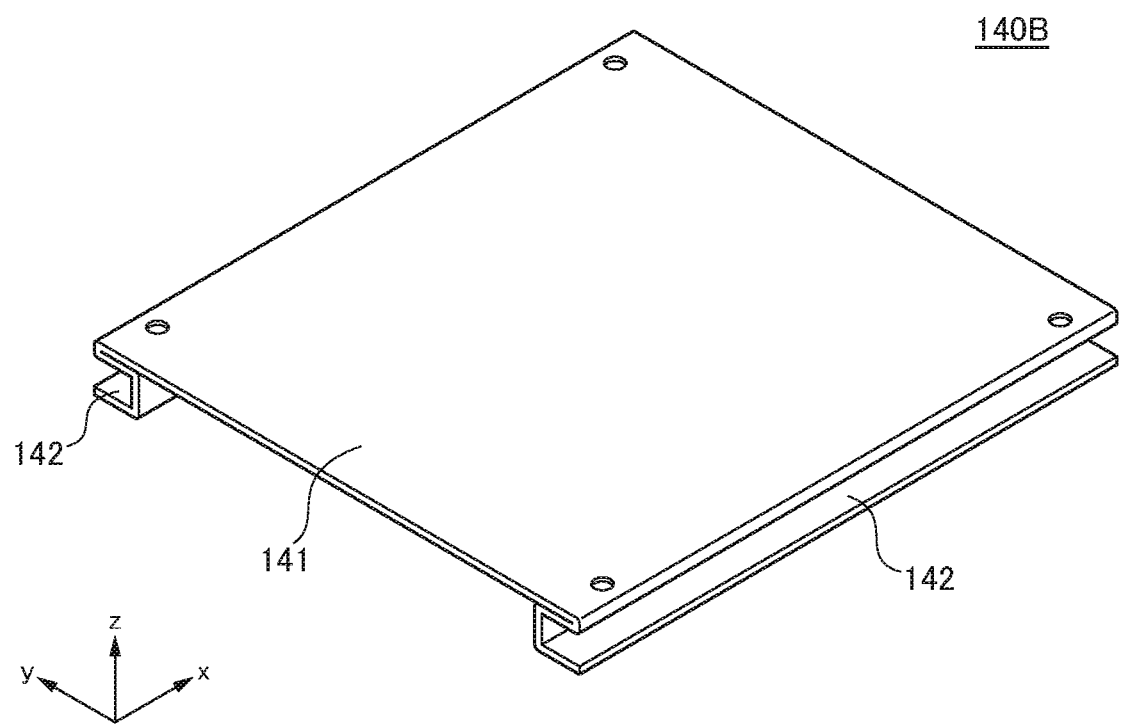
FIG. 12 is a schematic perspective view for explaining the shape of a metal plate 140B according to a second modification.
Figure 13:
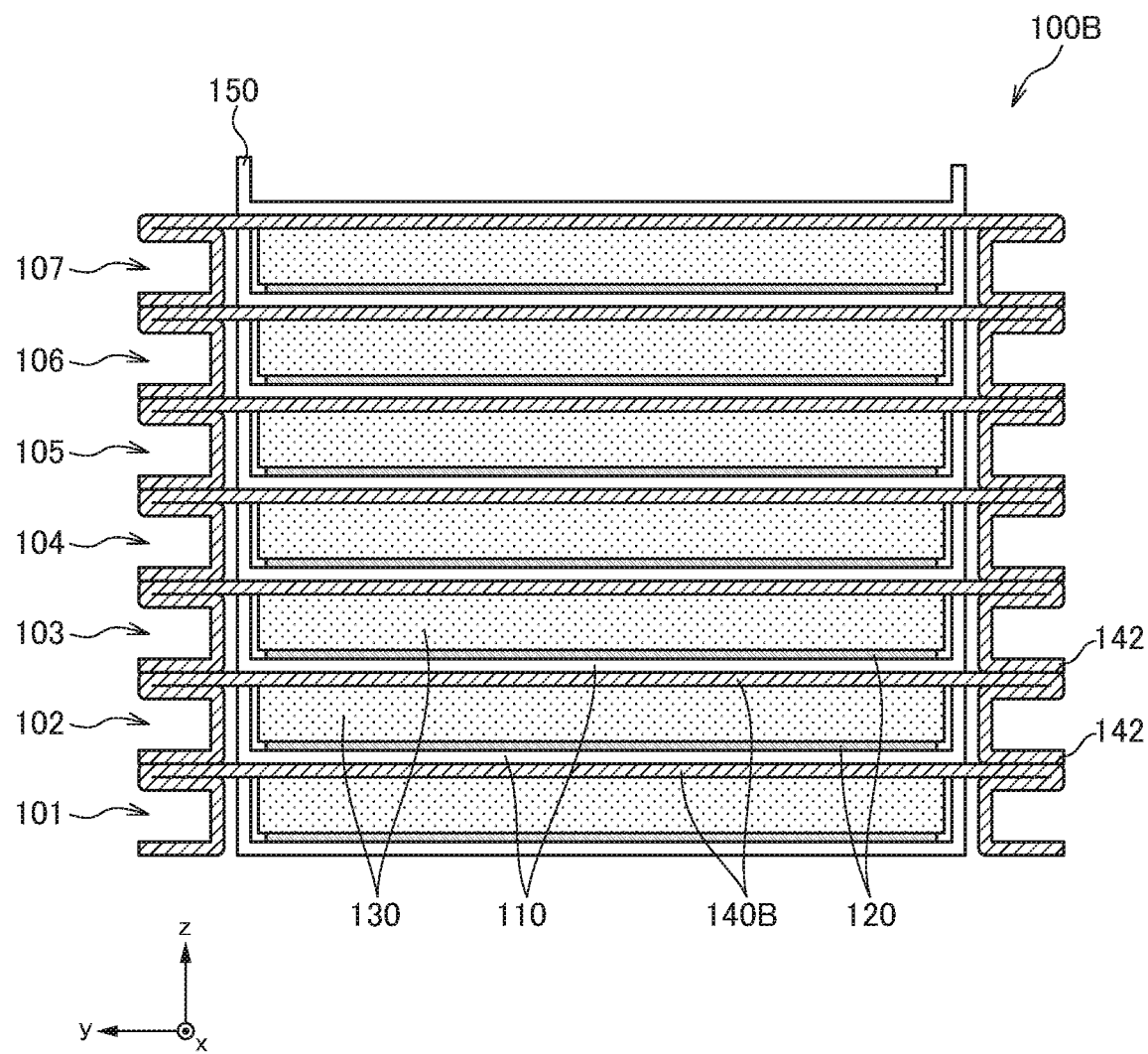
FIG. 13 is a schematic yz cross-sectional view of a cell stack 100B using a metal plate 140B.
Figure 14:
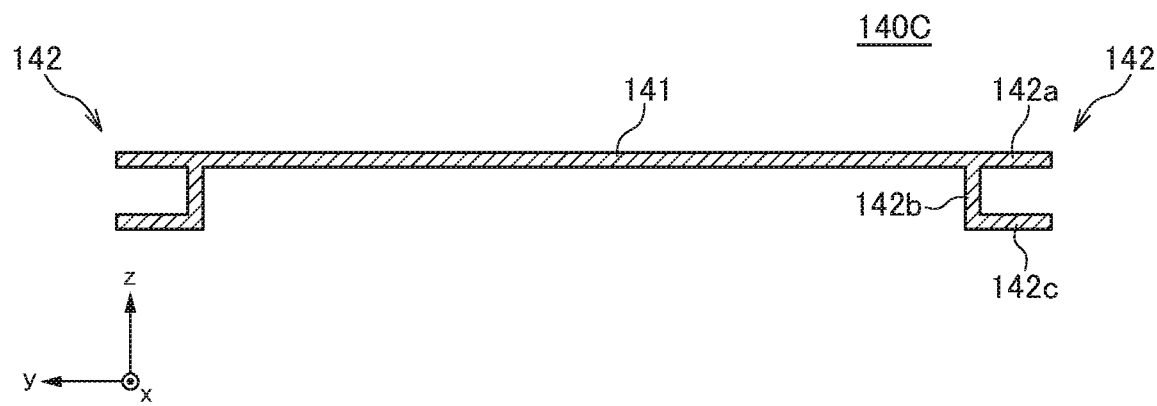
FIG. 14 is a schematic cross-sectional view for explaining the shape of a metal plate 140C according to a third modification.
Figure 15:
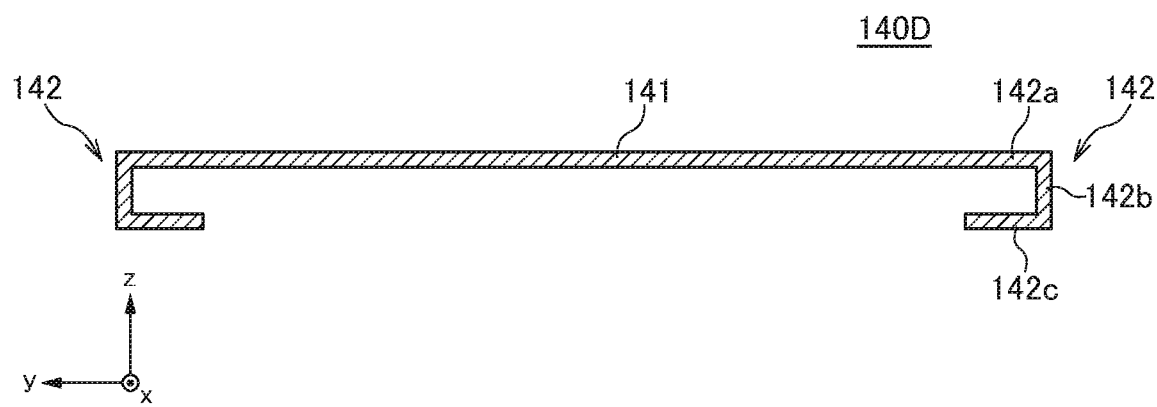
FIG. 15 is a schematic cross-sectional view for explaining the shape of a metal plate 140D according to a fourth modification.

In the example illustrated in FIGS. 12 and 13, the end portion of one metal plate 140 is folded three times (once folded inward by 180°, and then folded outward two times by) 90° to form the protrusion part 142. Alternatively, as in a metal plate 140C (FIG. 14) according to a third modification, it is possible to use an extrusion molding method to form the protrusion part 142 without folding it. Further alternatively, as in a metal plate 140D (FIG. 15) according to a fourth modification, the end portion of one metal plate 140 may be folded twice (folded inward two times by 90°) to form the protrusion part 142. However, assuming that a part of the protrusion part 142 that constitutes the same plane as the main area 141 is defined as a first part 142a, a part of the protrusion part 142 that is connected to the first part 142a and extends in the z-direction is defined as a second part 142b, and a part of the protrusion part 142 that is connected to the second part 142b and the first part 142a of another protrusion part 142 adjacent in the z-direction is defined as a third part 142c, the first and third parts 142a and 142c preferably protrude in a direction (x-direction or y-direction) away from the resin holder 110 and flat cell 130 as viewed from the second part 142b, as in the metal plates 140B and 140C illustrated in FIGS. 12 to 14, to constitute a heat dissipating fin. With this configuration, a higher heat dissipation effect can be achieved.

Figure 16:
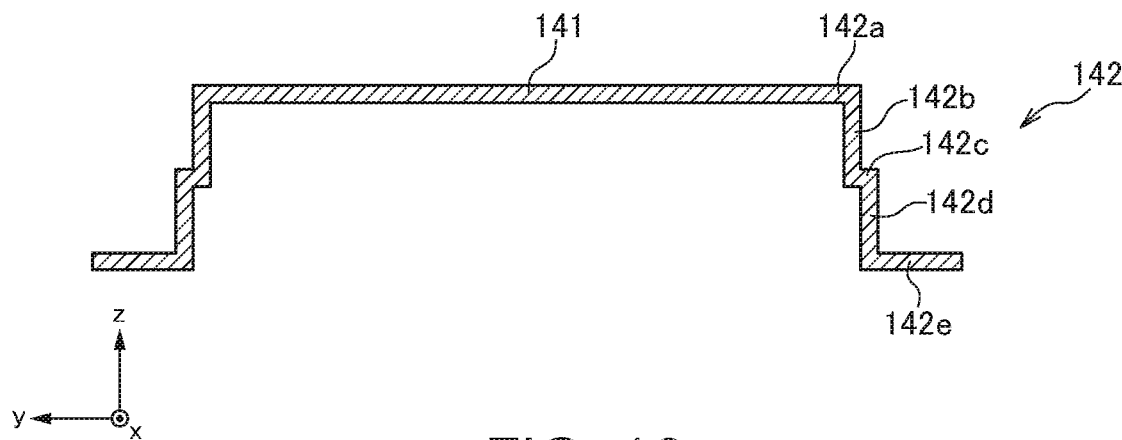
FIG. 16 is a schematic cross-sectional view for explaining the shape of a metal plate 140E according to a fifth modification.
Figure 17:
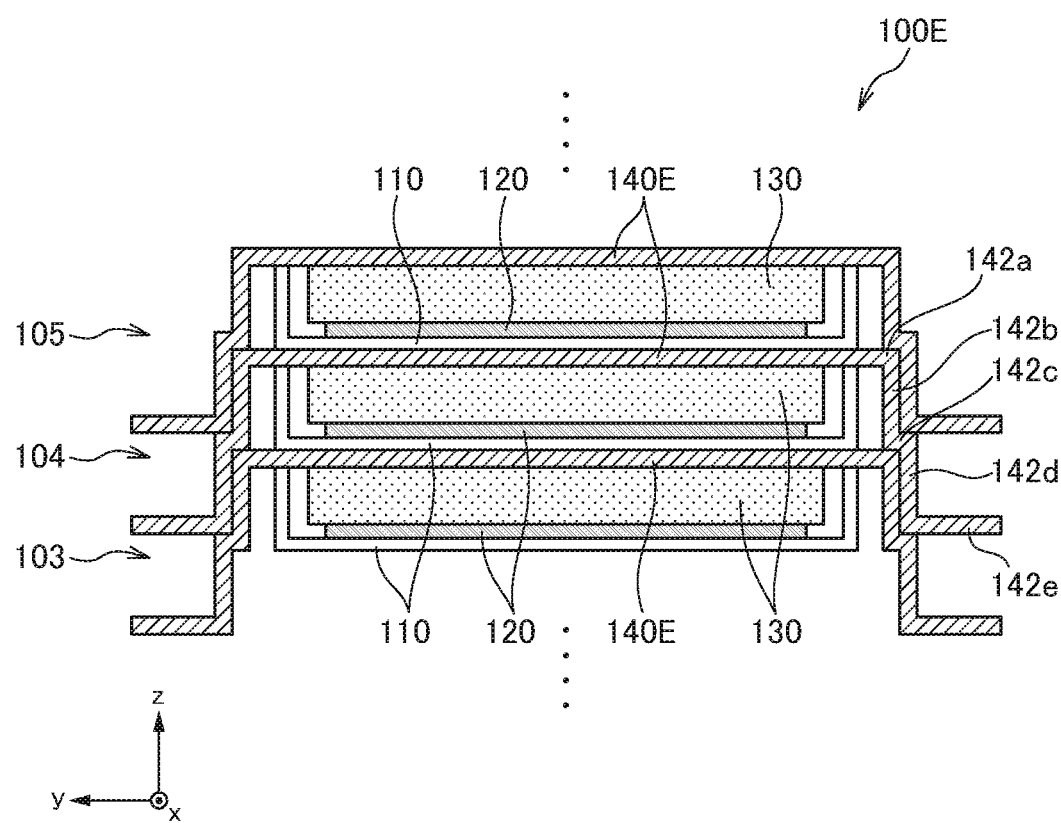
FIG. 17 is a schematic yz cross-sectional view of a cell stack 100E using the metal plate 140E.

Further, as in a metal plate 140E (FIG. 16) according to a fifth embodiment, the end portion of one metal plate 140 may be folded four times (sequentially folded inward by 90°, outward by 90°, inward by 90°, and outward by 90°) to form the protrusion part 142. Assuming here that a part of the protrusion part 142 that constitutes the same plane as the main area 141 is defined as a first part 142a, a part of the protrusion part 142 that is connected to the first part 142a and extending in the z-direction is defined as a second part 142b, a part of the protrusion part 142 that is connected to the second part 142b and extending in the y-direction is defined as a third part 142c, a part of the protrusion part 142 that is connected to the third part 142c and extending in the z-direction is defined as a fourth part 142d, and a part of the protrusion part 142 that is connected to the fourth part 142d and extending in the y-direction is defined as a fifth part 142e, the first part 142a contacts the third part 142c of the metal plate 140E in the upper layer, the second part 142b contacts the fourth part 142d of the metal plate 140E in the upper layer, the third part 142c contacts the first part 142a of the metal plate 140E in the lower layer, the fourth part 142d contacts the second part 142b of the metal plate 140E in the lower layer, and the fifth part 142e protrudes in the y-direction, as illustrated in FIG. 17 which is a yz cross-sectional view of a cell stack 100E using the metal plate 140E.

To achieve the above configuration, the metal plate 140E is designed such that the dimension between the outer sides of a pair of the second parts 142b positioned at both ends in the y-direction and the dimension between the inner sides of a pair of the fourth parts 142d positioned at both ends in the y-direction substantially coincide with each other and that the dimension of the second part 142b in the z-direction and the dimension of the fourth part 142d in the z-direction substantially coincide with each other. This significantly increases the contact area between the metal plates 140E adjacent in the vertical direction, making it possible to achieve higher heat dissipation characteristics. When the metal plate 140E according to the fifth modification is used, heat is more apt to be applied through the metal plate 140E to other flat cells 130 that have not generated heat abnormally; however, the heat to be applied to other flat cells 130 does not become significantly high due to the heat dissipation effect of the protrusion part 142.

It is apparent that the present invention is not limited to the above embodiments, but may be modified and changed without departing from the scope and spirit of the invention.

What is claimed is:

1. A battery pack comprising:
    a first resin holder having a first bottom plate part extending in first and second directions perpendicular to each other, first and second side plate parts extending in the first direction and a third direction perpendicular to the first and second direction, and third and fourth side plate parts extending in the second and third directions;
    a first metal plate having a first metal part that overlaps the first bottom plate part in the third direction, second and fourth metal parts that overlap the first side plate part in the third direction, and third and fifth metal parts that do not overlap the first resin holder in the third direction; and
    a first battery cell housed in the first resin holder such that the first battery cell is sandwiched between the first bottom plate part and the first metal part in the third direction,
    wherein the first battery cell is sandwiched between the first side plate part and the second side plate part in the second direction, and wherein the first battery cell is sandwiched between the third side plate part and the fourth side plate part in the first direction,
    wherein the second metal part is located between the first metal part and the third metal part,
    wherein the fourth metal part is located between the first metal part and the fifth metal part,
    wherein the third metal part and the fifth metal part are located outside the first resin holder beyond the first side plate part, and are separated from each other by a gap outside the first resin holder,
    wherein the first side plate part has a first section that overlaps the second metal part of the first metal plate in the third direction, a second section that overlaps the fourth metal part of the first metal plate in the third direction, and a third section that does not overlap the first metal plate in the third direction and located between the first section and the second section, wherein the first and second sections are smaller in height than the third section in the third direction, and wherein the third section of the first side plate part has a projection having a screw hole.

2. The battery pack as claimed in claim 1, wherein the first metal plate is a flat shape with no bends.

3. The battery pack as claimed in claim 1, further comprising a sheet member positioned between the first bottom plate part of the first resin holder and the first battery cell, wherein the sheet member is lower in heat conductivity and higher in flexibility than the first resin holder.

4. The battery pack as claimed in claim 1, further comprising:

a second resin holder having a second bottom plate part extending in the first and second directions, fifth and sixth side plate parts extending in the first and third directions, and seventh and eighth side plate parts extending in the second and third directions; and a second battery cell housed in the second resin holder such that the second battery cell overlaps the second bottom plate part in the third direction, that the second battery cell is sandwiched between the fifth and sixth side plate parts in the second direction, and that the second battery cell is sandwiched between the seventh and eighth side plate parts in the first direction, wherein the first and second resin holders are stacked such that the first, second, third, and fourth side plate parts overlap the fifth, sixth, seventh, and eighth side plate parts, respectively, and wherein the second and fourth metal parts of the first metal plate are positioned in a space between the first and second sections of the first side plate part and the fifth side plate part.

5. The battery pack as claimed in claim 4, wherein the second side plate part has upper and lower level surfaces extending in the first and second direction and an inner side surface extending in the first and third direction, wherein the upper level surface contacts with the second resin holder, and wherein the first metal plate further has a sixth metal part sandwiched between the lower level surface and the second resin holder.

6. The battery pack as claimed in claim 5, wherein the first metal plate contacts with the inner side surface of the second side plate part.

7. The battery pack as claimed in claim 1, wherein:

the first metal part has first, second and third side surfaces that are in contact with the second, third and fourth side plate parts, respectively, and a part of a fourth side surface is in contact with the first side plate part.

* * * * *